US005923556A

United States Patent [19]

Harris

[11] Patent Number: 5,923,556

[45] Date of Patent: Jul. 13, 1999

[54] METHOD AND APPARATUS FOR IMPRINTING AN ELECTRO-CARDIOGRAM TRACING ON A GREETING CARD AND OTHER ARTICLES

[76] Inventor: Cheryl Elizabeth Harris, 5558 Elm St., Vancouver British Columbia, Canada, V6N 1A4

[21] Appl. No.: 08/789,917

[22] Filed: Jan. 28, 1997

[51] Int. Cl.[6] .......................... G06F 19/00; G06G 7/6466

[52] U.S. Cl. ................................ 364/468.24; 364/468.26; 364/479.01; 364/479.03; 364/479.05

[58] Field of Search ......................... 364/468.24, 468.01, 364/468.26, 469.02, 470.02, 470.04, 474.04, 479.01, 479.03, 479.05, 479.09; 428/40, 414; 156/230, 239, 240, 241

[56] References Cited

U.S. PATENT DOCUMENTS

D. 352,308 11/1994 Reh ............................................... 40/1
4,414,981 11/1983 Wong et al. ............................ 128/712
4,855,910 8/1989 Bohning .................................. 364/413
4,873,643 10/1989 Powell et al. ........................... 364/468
5,284,365 2/1994 Stuart ...................................... 283/117
5,303,487 4/1994 Olson ........................................ 40/124
5,318,327 6/1994 Daneshvar .............................. 283/117
5,600,563 2/1997 Cannon et al. .................... 364/468.24
5,615,123 3/1997 Davidson et al. ................. 364/479.03

*Primary Examiner*—Reba I. Elmore
*Assistant Examiner*—Ramesh Patel
*Attorney, Agent, or Firm*—John Russell Uren

[57] ABSTRACT

Method and apparatus for producing a greeting card or merchandising item. An electrocardiogram wave is obtained from a user, digitized through a processor and stored in a computer. The electrocardiogram is passed to an output device and applied to the greeting card or merchandising item. A printed message may also be applied to the greeting card or the card may be preprinted prior to application of the electrocardiogram to the card. A monitor may display a virtual image of the card with the selection of the electrocardiogram and the position of the selected message on the card prior to actually printing the electrocardiogram and message on the card.

16 Claims, 7 Drawing Sheets

FIG. 4A (PAGE 1 OF 2)

CARDIAC PROGRAM EVENT FUNCTIONS

The program performs functions in response to the following events. The events are triggered by the user clicking on the menu bar or command buttons. One exception is the update timer which triggers itself when enabled.

Event PROGRAM START:
- Get the last settings from the file, "settings.ini"
- Open up the serial port.

Event FILE:
Event EXIT
- Save the current text to the "settings.ini" file.
- Stop the serial port being used and release the port.
- Exit the program .

Event OPTIONS:
Event COMMUNICATIONS PORT COM1
- If Com2 is being used, stop and release the port.
- Initialize the Com1 serial port.

Event COMMUNICATIONS PORT COM2
- If Com1 is being used, stop and release the port .
- Initialize the Com2 serial port.

Event HELP:
- Display the help dialog box.
- Close the box when the OK button is pressed.

Event TEXT:
- Copy the selected saying to the 3 text fields of the card.

Event PRINT FRONT PAGE:
- Set the printer orientation to landscape and the font to the font used for the text

FIG. 4A (PAGE 2 OF 2)

fields.
- Print the text which appears on the top of the first page.
- Print the text which appears on the bottom of the last page.

Event PRINT INSIDE PAGE:
- Set the printer orientation to landscape and the font to the font used for the text fields.
- Print the text which appears on the top of the inside page.
- Print the text which appears on the bottom of the inside page.
- Print the graph of the ECG tracing.

Event STOP SCANNING:
- Stop the ECG box from sending data.

- Stop receiving data from the serial port .
- Stop the Update timer.

Event START SCANNING:
- Clear the graph data buffer .
- Erase the graph picture box.
- Reset the graph buffer to the beginning .
- Flush the serial buffer .
- Start the ECG box sending data.
- Start the update timer.

Event UPDATE TIMER:
- Read data from the serial port in put it in the data buffer.
- If there is an error, stop scanning.
- If the buffer is full, stop scanning .
- Update the ECG trace picture box.

Event GRAPH SCROLL BAR CHANGED:
- Erase the graph .
- Redraw the graph from the new scroll bar location.

METHOD AND APPARATUS FOR IMPRINTING AN ELECTRO-CARDIOGRAM TRACING ON A GREETING CARD AND OTHER ARTICLES

This invention relates to a method and apparatus for producing a greeting card and related items and, more particularly, to a method and apparatus for producing a greeting card incorporating the electrocardiogram of a user.

BACKGROUND OF THE INVENTION

In recent years, greeting cards have been printed at the point-of-sale by a user with the assistance of a monitor and a programmed console. The user or customer selects the card style, the design and the message. In some instances, the user may create a custom or individualized message which appears on the card. However, while being more personalized, such cards lack the unique touch involving the heart or heartbeat of a sender which many find attractive. Such greeting cards can be used for many occasions including birthdays, anniversaries, weddings, Mother's Day and the like.

SUMMARY OF THE INVENTION

According to one aspect of the invention, there is provided a method for manufacturing an article having an electrocardiogram trace appearing thereon, said method comprising obtaining an electrocardiogram wave from a user, digitizing said electrocardiogram wave through a processor, transforming said electrocardiogram wave into a machine readable form, transferring at least a portion of said electrocardiogram wave to a computer and storing said electrocardiogram wave in machine readable form within said computer, transferring said electrocardiogram wave to an output device and applying said electrocardiogram wave from said output device to said article.

According to a further aspect of the invention, there is provided an apparatus for manufacturing an article comprising means to obtain an electrocardiogram wave from a user, a processor to digitize in machine readable form said electrocardiogram wave, a computer to store at least a portion of said electrocardiogram wave, and an output device to receive said portion of said electrocardiogram from said computer and to apply said electrocardiogram to said article.

BRIEF DESCRIPTION OF THE SEVERAL VIEWS OF THE INVENTION

Specific embodiments of the invention will now be described, by way of example only, with the use of drawings in which.

DESCRIPTION OF SPECIFIC EMBODIMENT

Figure 1A:
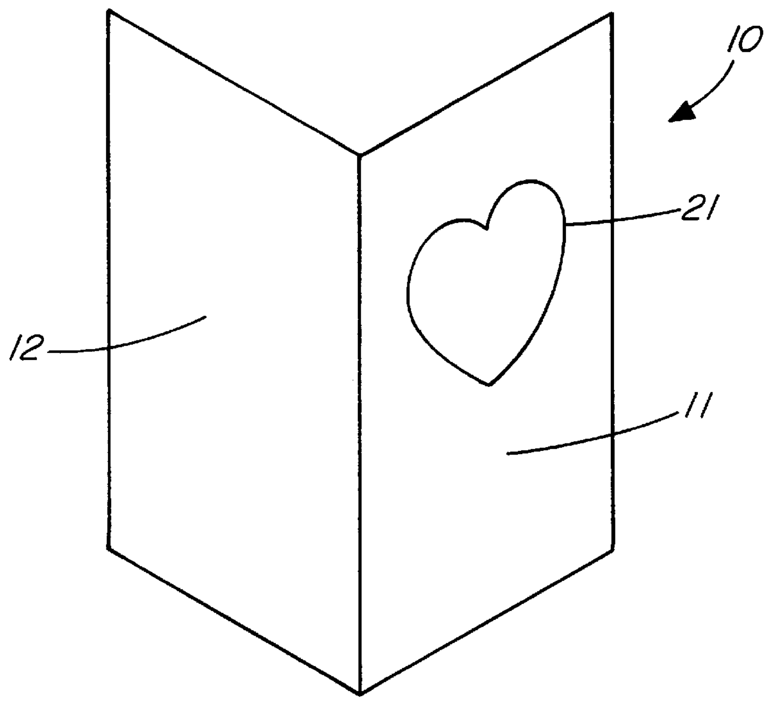
FIGS. 1A and 1B are front and isometric views, respectively, of a greeting card according to the invention, illustrating the electrocardiogram (ECG) trace but without a printed message.
Figure 1B:
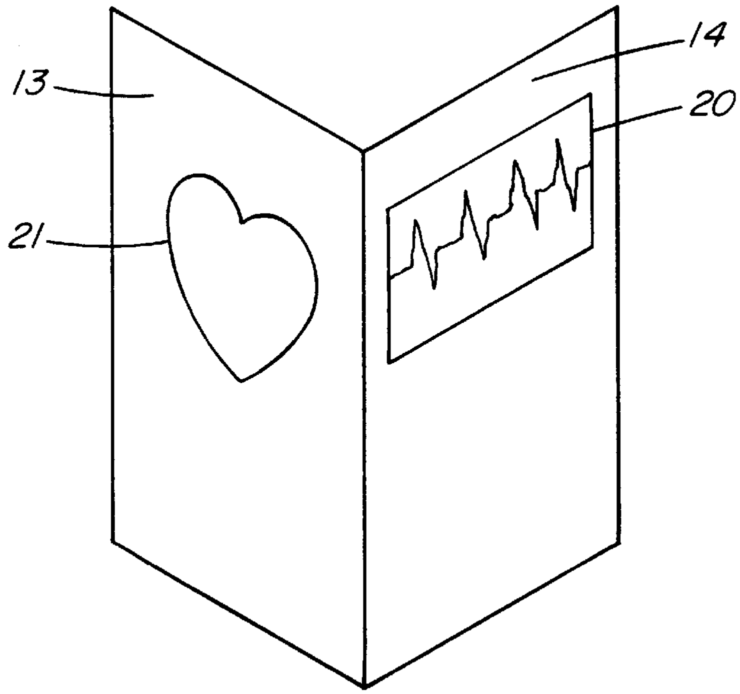

Referring now to the drawings, the greeting card according to the invention is illustrated generally at 10 in FIGS. 1(*a*) and 1(*b*). It comprises a front cover 11, a rear cover 12, and inside left and right hand pages 13, 14, respectively. An electrocardiogram trace 20 appears on the inside right hand page 14 of the greeting card 10 as will be described in greater detail. A cutout portion 21, conveniently in the shape of a heart, may be positioned on the front cover 11 such that the electrocardiogram tracing 20 may be seen when the greeting card 10 is closed. A printed message (not illustrated) with appropriate sentiments may appear anywhere on the greeting card 10.

The electrocardiogram tracing 20 is printed onto the greeting card 10 by means of a printer or other output device 48 (FIG. 2) as will be explained. Likewise, the printer 48 will print out a selected message (not illustrated), either a message which is individually prepared by the user or a message which may be one of numerous messages prepared for selection by the user.

Figure 2:
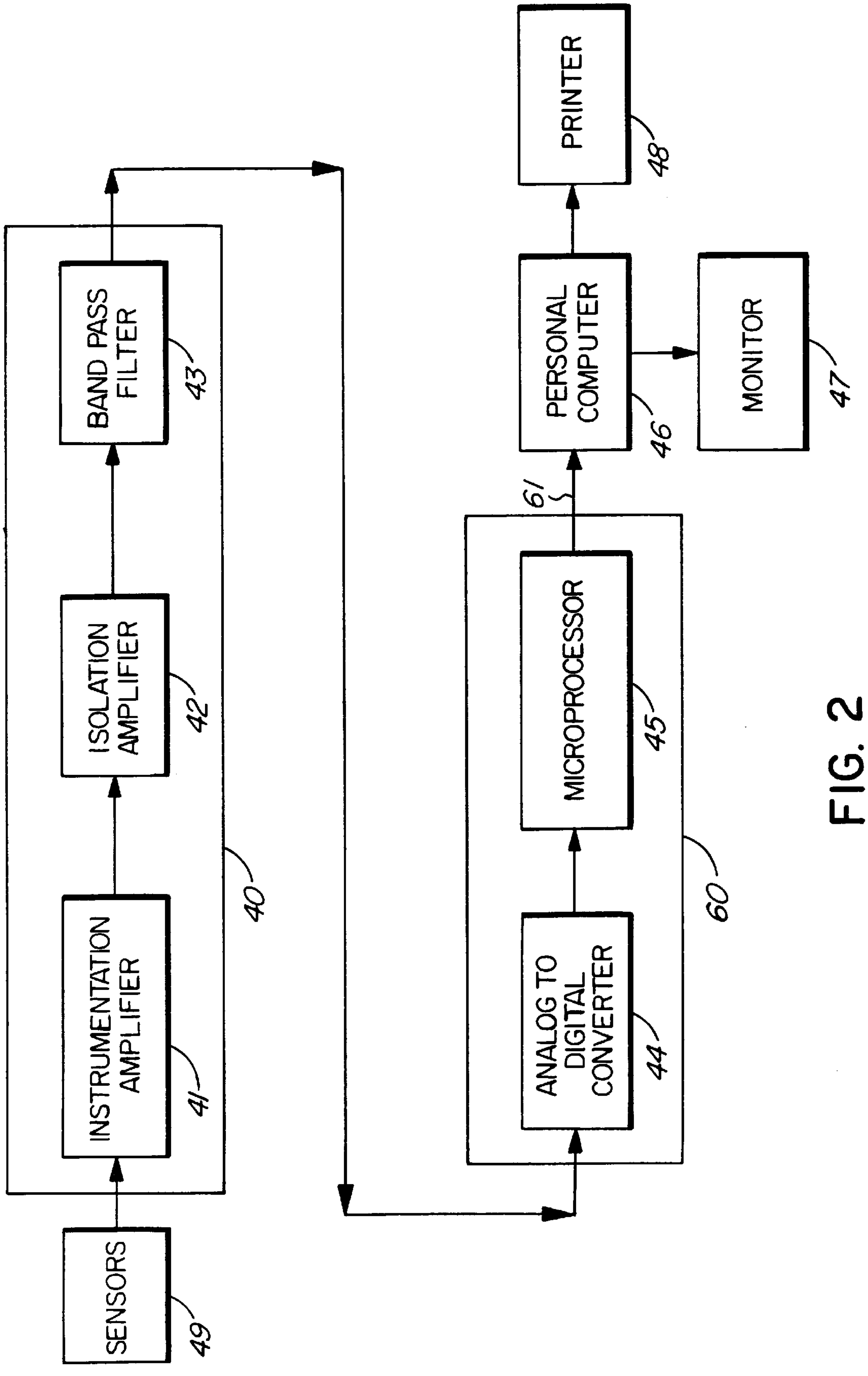
FIG. 2 is a block diagram illustrating the wave conditioning or amplification and filtering device, the processor, the computer and the output device utilized in creating the greeting card illustrated in FIGS. 1A and 1B.

With reference to FIG. 2, a conduction medium, conveniently electrodes 49, is attached to the user and the signal generated by the user's heart passes to instrumentation amplifier 41, isolation amplifier 42 and a bandpass filter 43 within wave conditioning device 40. The signal is then passed to processor 60 which digitizes the signal into machine readable form. The processor, generally illustrated at 60, includes analog to digital converter 44 and a microprocessor 45. This processor 60 converts the analog ECG signal to digital numbers representing the voltage levels in the trace. The microprocessor 45 controls analog/digital functions and passes the digitized, machine readable signal to the personal computer (PC) 46 over an RS232 serial link 61, the numbers representing the time samples of the waveform (i.e., voltage collected over time). At computer (PC) 46, the user may select the appropriate message and the appropriate placement for the message from monitor 47 which monitor 47 may conveniently display a virtual image of the greeting card 10 with the message and electrocardiogram trace 20 shown thereon.

Figure 4B:
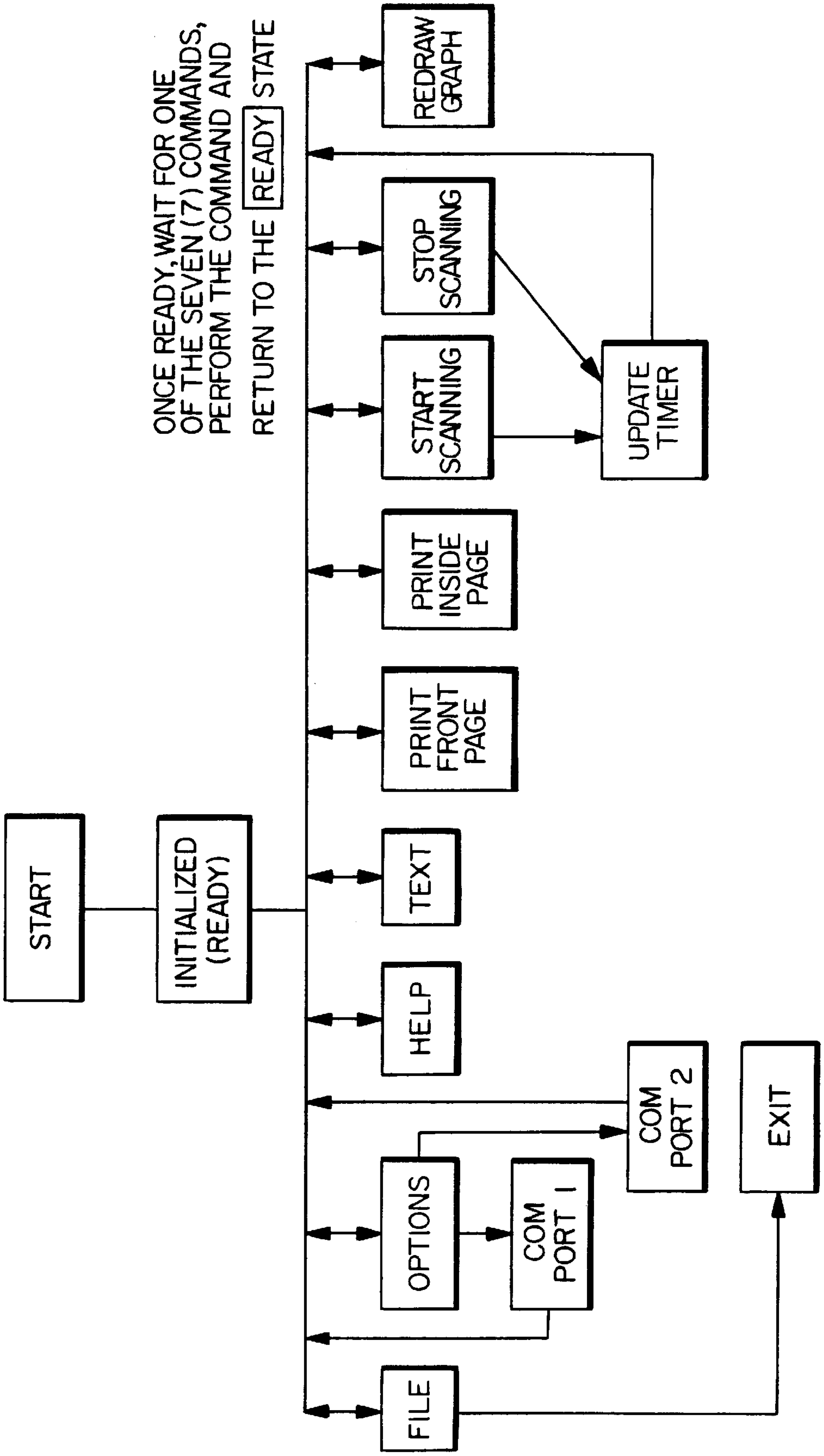
FIG. 4 is the code description of the cardiac program event function software used in the computer.
Figure 5:
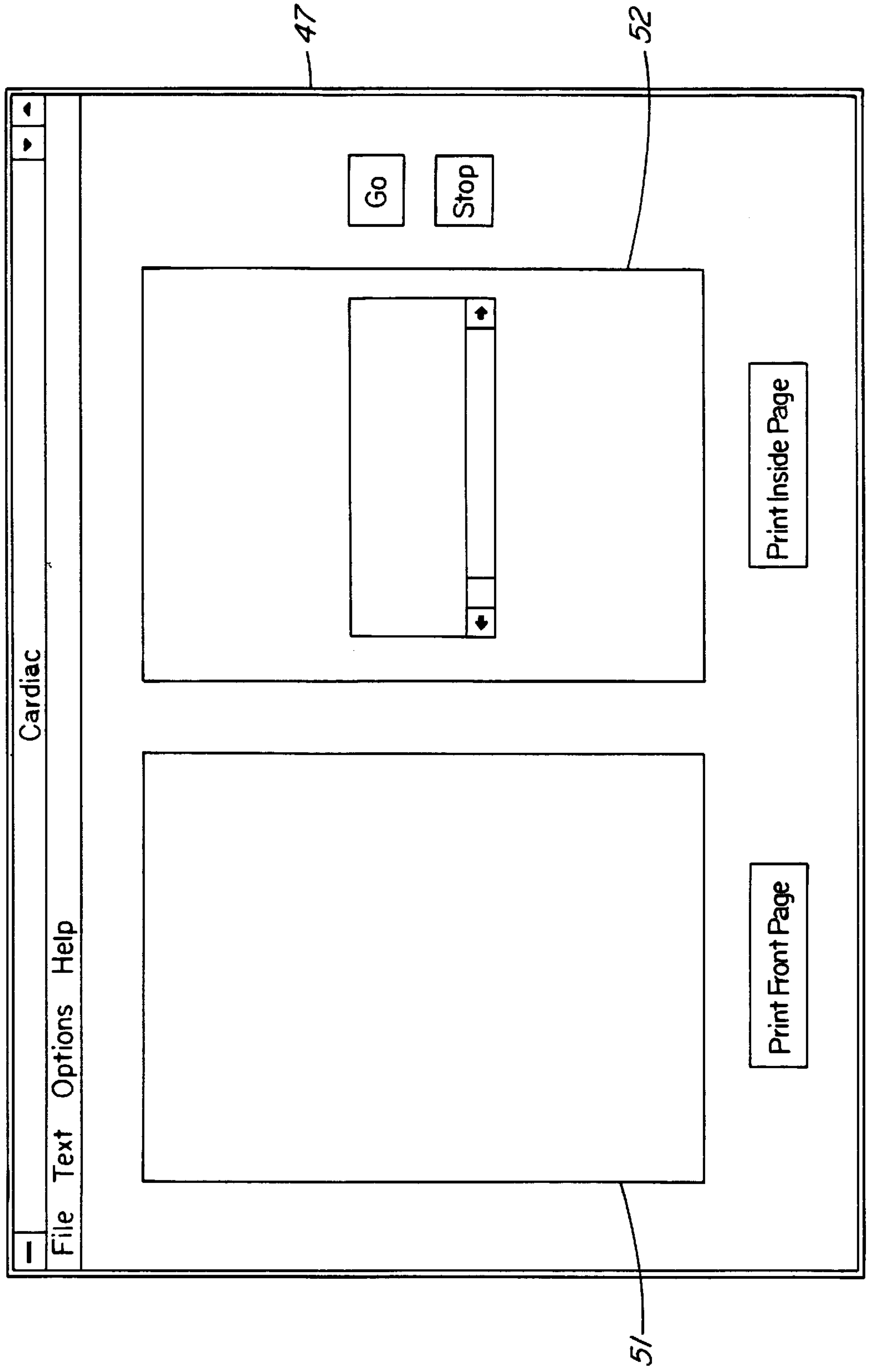
FIG. 5 illustrates a typical window displayed by the monitor of the personal computer which is used to assist in the selection of the electrocardiogram and the selection and positioning of the message on the greeting card prior to the actual imprinting process.

The software used to program the PC 46 is illustrated in FIG. 4. The software receives waveforms from the processor 60 and stores the waveforms in memory. The software allows the PC 46 to select and display an appropriate message and to then imprint the message and the ECG on the greeting card 10. The monitor 47 displays the windows shown in FIG. 5. As illustrated, the front page screen 51 is displayed on the left side of the monitor 47 with the inside page being displayed at 52.

OPERATION

In operation and with reference to FIG. 2, a user will approach the wave conditioning device 40 and make momentary contact with electrodes 49 which are desirably placed directly on dry, clean skin. The skin surface electrodes 49 detect the heartbeat and the wave conditioning device 40 transforms the electrical signals generated by the heart into an electrocardiogram. The waveform is digitized into machine readable form after it is processed through analog to digital converter 44 and microprocessor 45. The ECG in machine readable form is transferred to a computer generally illustrated at 46 consisting of the various hardware items illustrated in FIG. 2. The ECG is subsequently passed to an output device, conveniently a printer 48, where it is printed onto the greeting card 10. At the same time, the user may select a preprinted greeting or message to appear on the card 10 or, alternatively, the user may create his own personalized greeting or message to appear on the greeting card 10. Conveniently, the PC 46 with a monitor 47 displays a virtual image of the greeting card 10. PC 46 and monitor 47 may also display a number of individual messages for selection by the user. When a desired message is selected by the user, the position of the message on the card 10 will also be shown on the monitor 47 and the position of imprint may be illustrated. The user, therefore, may select the ECG and may select and position the message where it is so desired on the top or bottom of the inside or outside of the card 10 as shown on the virtual image of the card 10 displayed on the monitor 47.

When the user is satisfied with the ECG wave produced, the message chosen and their placements on the virtual image of the greeting card 10 on monitor 47, the user instructs the computer 46 to pass the information to the output device. If the article to be imprinted is a greeting card 10, the output device 48 is conveniently a printer.

The invention may conveniently be applied to many other articles of manufacture in addition to a greeting card. Various promotional items such as clothing, merchandising items of a paper nature such as stationery, bookmarkers, calendars, posters, book covers, business cards and the like, mugs, glasses, decals, balloons, buttons, pennants, refrigerator magnets and the like may also be imprinted with an ECG of a user thereby creating a heart type article.

Figure 3A:
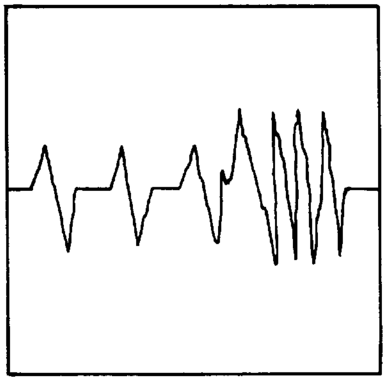
FIGS. 3A, 3B and 3C illustrate other ECG tracings created by a user which may be used with the greeting card of FIG. 1 and which relate to body condition or positioning.
Figure 3B:
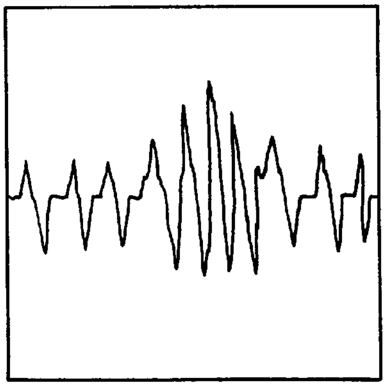
Figure 3C:
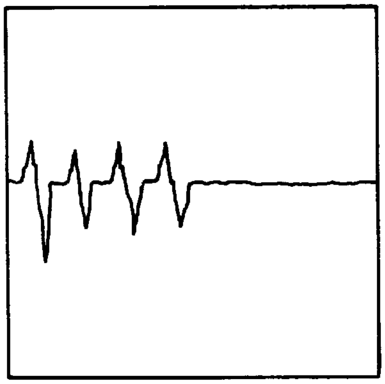

In addition to the "normal" ECG generated when the user is in a resting state, other ECG traces may be obtained from the user depending on the movements of the user and his body state. Various of these other ECG tracings are illustrated, for example, in FIGS. 3A–3C. These tracings may be obtained by tensing muscles, talking, breathing irregularly or moving various limbs while the ECG is being taken or then removing a skin electrode connection to make a flat line on the ECG.

While a user may conveniently use skin electrodes 49 in order to generate an ECG, an ECG may, of course, be generated utilizing other techniques. For example, other conducting mediums could be used such as a watchband-type skin surface electrode which is placed on each wrist or hands may be placed on a conduction medium surface in order to detect a heartbeat and generate the waveform.

The ECG wave or signal is then conditioned by the wave conditioning device 40 and the output enters the processor 60 where it is digitized, passed to the PC 46 by way of an RS232 serial link 61 and displayed on monitor 47.

While specific embodiments of the invention have been described, such embodiments are illustrative of the invention only and should not limit its scope as defined in accordance with the accompanying claims.

I claim:

1. A method for manufacturing a merchandising item having an electrocardiogram trace appearing thereon, said method comprising obtaining an electrocardiogram wave from a user using a device externally of and connected to a computer, selecting a predetermined portion of said electrocardiogram wave, digitizing said predetermined portion of said electrocardiogram wave through a processor, transforming said predetermined portion of said electrocardiogram wave into machine readable form, transferring said predetermined portion of said electrocardiogram wave to said computer and storing said predetermined portion of said electrocardiogram wave in machine readable form within said computer, transferring said predetermined portion of said electrocardiogram wave to an output device and applying said predetermined portion of said electrocardiogram wave from said output device to said item.

2. A method as in claim 1 and further comprising printing a message on said item.

3. A method as in claim 2 and further comprising displaying said predetermined portion of said electrocardiogram wave on a monitor prior to applying said predetermined portion of said electrocardiogram wave to said item.

4. A method as in claim 3 and further comprising displaying a message on said monitor prior to applying said predetermined portion of said electrocardiogram wave to said item.

5. A method as in claim 4 and further comprising displaying a virtual image of a greeting card on said monitor with said message and said predetermined portion of said electrocardiogram wave prior to applying said message and said predetermined portion of said electrocardiogram wave to said item.

6. A method as in claim 1 wherein said item is a greeting card.

7. A method as in claim 6 wherein said merchandising item is one of an article of clothing, an article of paper nature including stationery, bookmarkers, calenders, book covers, posters, business cards and decals, a mug, a glass, a balloon, a button, a pennant or a refrigerator magnet.

8. Apparatus for manufacturing a merchandising item comprising a device to obtain an electrocardiogram wave from a user, a processor to digitize in machine readable form a predetermined portion of said electrocardiogram wave, a computer to accept and store said predetermined portion of said electrocardiogram wave, and an output device to receive said predetermined portion of said electrocardiogram wave from said computer and to apply said predetermined portion of said electrocardiogram wave to said item.

9. Apparatus as in claim 8 wherein said output device is a printer.

10. Apparatus as in claim 9 wherein said output device also applies printing to said item.

11. Apparatus as in claim 10 wherein said computer further includes a monitor for displaying said predetermined portion of said electrocardiogram wave.

12. Apparatus as in claim 11 wherein said monitor further displays said printing to be applied to said item.

13. Apparatus as in claim 11 wherein said computer is a personal computer.

14. Apparatus as in claim 12 wherein said monitor further displays a virtual image of said item.

15. Apparatus as in claim 14 wherein said item is a greeting card.

16. Apparatus as in claim 15 wherein said merchandising item is one of an article of clothing, an article of paper nature including stationery, bookmarkers, calenders, book covers, posters, business cards and decals, a mug, a glass, a balloon, a button, a pennant or a refrigerator magnet.

* * * * *